United States Patent [19]

Huebner et al.

[11] Patent Number: 5,575,372
[45] Date of Patent: Nov. 19, 1996

[54] DEVICE FOR PREVENTING SHEARING OR PINCHING OF A FOREIGN OBJECT

[75] Inventors: Gerd Huebner; Michael Heitmann, both of Jena, Germany

[73] Assignee: Jenoptik Technologie GmbH, Jena, Germany

[21] Appl. No.: 356,457

[22] Filed: Dec. 15, 1994

[30] Foreign Application Priority Data

Jun. 22, 1994 [DE] Germany .......................... 44 21 828.1

[51] Int. Cl.⁶ ...................................................... F16P 3/00
[52] U.S. Cl. ................................. 192/116.5; 192/125 A; 200/61.42; 200/61.5
[58] Field of Search ............................ 192/116.5, 125 A, 192/129 A; 200/85 R, 61.41, 61.42, 61.39, 61.76, 61.5

[56] References Cited

U.S. PATENT DOCUMENTS

| | | | |
|---|---|---|---|
| 3,574,918 | 4/1971 | Focht | 192/125 A X |
| 4,042,918 | 8/1977 | Klitzman | 200/61.64 X |
| 4,152,558 | 5/1979 | Newman | 200/61.42 |
| 4,400,850 | 8/1983 | Burnett | 19/0.23 |
| 4,533,799 | 8/1985 | Vincent De Araujo | 200/61.5 X |
| 4,859,818 | 8/1989 | Landais | 200/61.3 X |

FOREIGN PATENT DOCUMENTS

| | | |
|---|---|---|
| 2854459 | 8/1980 | Germany . |
| 3420225 | 12/1984 | Germany . |
| 3606499 | 7/1987 | Germany . |
| 3725360 | 2/1989 | Germany . |
| 3843478 | 2/1990 | Germany . |
| 3928984 | 3/1991 | Germany . |
| 4038224 | 12/1991 | Germany . |
| 4121916 | 1/1993 | Germany . |
| 4326309 | 9/1994 | Germany . |

*Primary Examiner*—Andrea L. Pitts
*Attorney, Agent, or Firm*—McAulay Fisher Nissen Goldberg & Kiel, LLP

[57] ABSTRACT

A device for preventing shearing or pinching of a foreign object is suitable for use in SMIF (Standard Mechanical Interface) systems. A barrier which is constructed as a solid body is fastened at and displaceable relative to one of two parts which can move past one another. The barrier is fastened to this part at a distance above electric contact elements in three-point formation, which distance is greater than the maximum braking distance required for stopping movement. The barrier is substantially adapted in shape and position at its shearing line to the part moving past it, wherein contact is broken in at least one contact element and accordingly in an otherwise closed circuit when the barrier is displaced relative to the part. Such devices serve to prevent injuries and damage in the operation of systems in which two parts move past one another at a slight distance.

28 Claims, 3 Drawing Sheets

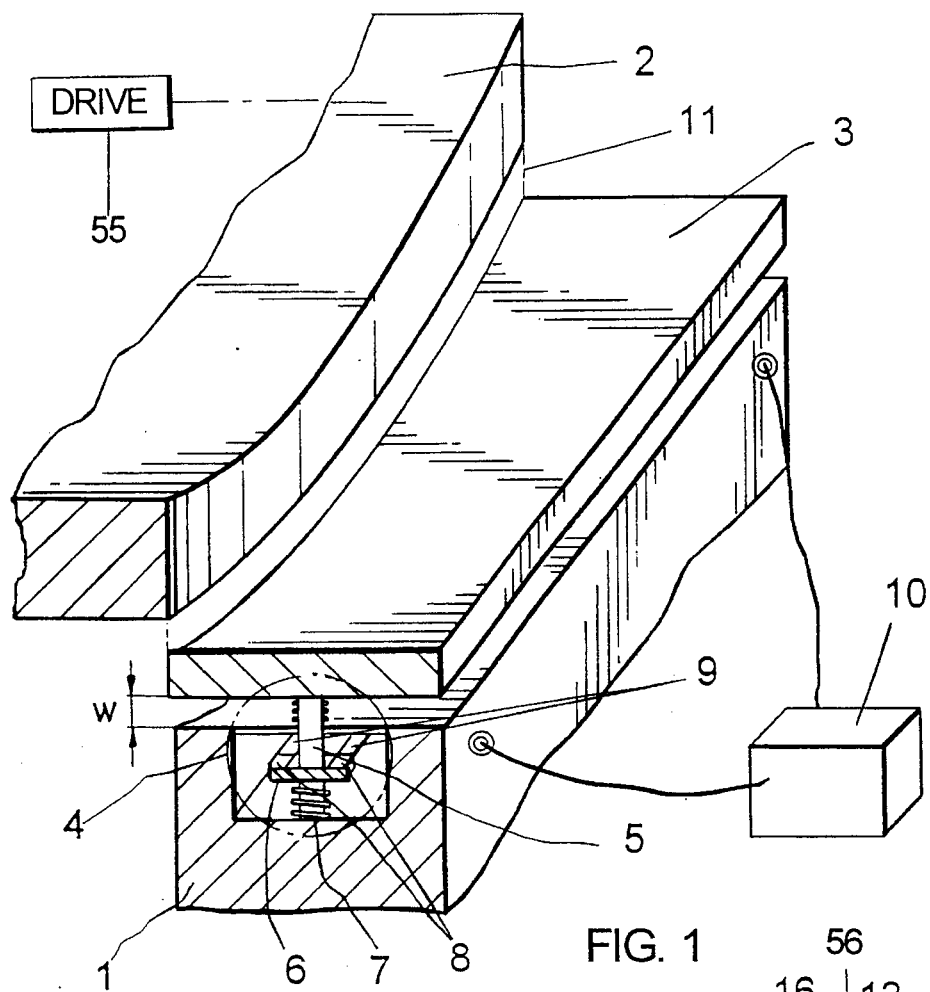
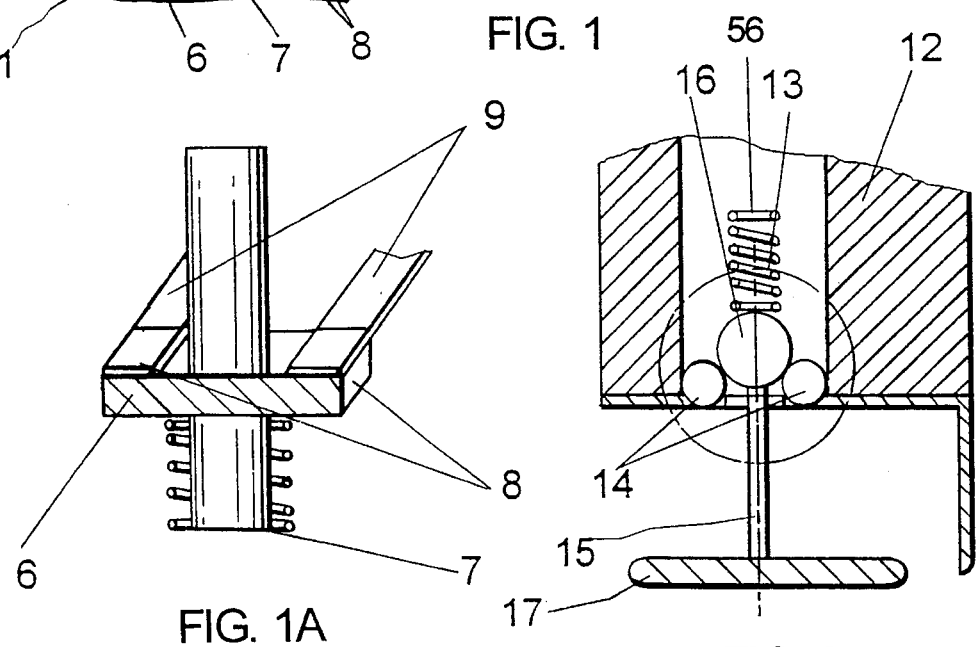

DEVICE FOR PREVENTING SHEARING OR PINCHING OF A FOREIGN OBJECT

BACKGROUND OF THE INVENTION

1. Field of the Invention

The present invention is directed to a device for preventing a foreign object from being sheared or pinched when two parts which can move past one another approach one another, in particular, in the operation of loading and unloading stations in a clean room area or in its vicinity, in which a signal of a sensor interrupts the approach when the presence of a foreign object is detected in the region of approach.

2. Description of the Related Art

Safety devices for preventing injuries and damage during the operation of systems in which two parts move past one another at a slight distance are known primarily from the domain of heavy machinery construction and agricultural machinery construction and, as automation increases, are required in all industrial areas for the protection of men and machines.

In one method the danger zone is blocked off generally by screens and enclosures. When manual intervention cannot be avoided in one-man operation, a two-hand control may be a good solution. If it is compulsory that several persons be stationed in the danger area or if multiple machines are being operated, controls are used which either deflect intervention or terminate the movement of the machinery. Sensors such as light barriers, pressure hoses, contact tapes, motion alarms, feelers or the like, whose signals are used to switch off or brake the movement of the machinery, are used to detect the approach of a body.

DE 34 20 225 A1 uses a so-called end strip as a mechanical sensor in combination with switches for detecting foreign objects in the danger zone of a lifting platform. An arrangement at the moving part, the construction of switches as closers or contact makers and the lack of sensitivity of large end strips to the horizontal action of foreign bodies can be disadvantageous because a lateral deflection does not compulsorily result in a connection.

DE 36 06 499 C1, DE 38 43 478 C1 and DE 40 38 224 C1 make use of a pretensioned special safety strip as means for protecting against terminating edges. This safety strip has a plurality of contact elements arranged in a row, the electrical circuit formed by these contact elements being interrupted by the influence of external force. Difficulties arise when angles and small radii are present. Problems with the safety run-off occur at the ends of the safety strip.

DE 37 25 360 A1, DE 28 54 459 and DE 41 21 916 A1 are disadvantageous in that the closer functions as a contact or as a result of the high cost for monitoring operation.

In order to afford protection from shearing edges of platform parts moving vertically relative to one another, DE 39 28 984 C2 makes use of a taut track which extends downward and has a control element which detects movement of the track. This invention is too bulky and imprecise for special use, e.g., in local clean rooms under the conditions required by so-called SMIF systems (Standard Mechanical Interface described, e.g., in DE 43 26 309 C1). Further, an air flow which is required in these SMIF systems can adversely affect the reliability of such a solution. In such systems, it is necessary in particular to avoid penetration of foreign objects in the region located between an upper frame and the descending or ascending base acting as platform.

OBJECT AND SUMMARY OF THE INVENTION

A primary object of the present invention is to provide a safety device suitable for the SMIF systems mentioned above.

This object is met according to the invention by a device for preventing shearing or pinching of a foreign body when two parts which can move past one another approach one another, in particular in the operation of loading and unloading stations in a clean room area or in its vicinity, in which a signal of a sensor interrupts the approach when the presence of a foreign body is detected in the region of approach. A barrier which is constructed as a solid body is fastened to one of the parts so as to be displaceable relative to this part above electric contact elements in three-point formation at a distance greater than the maximum braking distance required for stopping movement. The barrier is substantially adapted in shape and position at its shearing line to the part moving past it. Contact is broken in at least one contact element and, accordingly, in an otherwise closed circuit when the barrier is displaced relative to the part.

The barrier is advantageously fastened at the stationary part so as to be supported in a resilient manner by guide pins by means of three contact elements which are arranged one after the other in a row. Each guide pin carries a contact bridge for closing the electrical circuit. This electrical circuit is broken when at least one of the contact bridges disengages from contacts of the lines forming the electrical circuit when the barrier presses against the stationary part.

The barrier can also be fastened to one end of a pin carrying a spherical contact bridge at its other end. This spherical contact bridge is supported on stationary contacts arranged inside the stationary part to form the closed circuit. A pressure spring which presses the contact bridge against the contacts can be used for stability.

In an advantageous manner, the barrier can also be supported on contacts of angled parts of the stationary first part by contacts which are connected by conductor paths.

In order to achieve a reproducible support of the barrier, the contact elements are advantageously arranged radially so that lines drawn through the center of the contact elements intersect in the center of a circle.

In an arrangement of this type, the contact elements should be formed by cylindrical contacts which are connected to adjacent parts of an interrupted conductor path on a printed circuit board and between which a spherical element produces an electric connection which is connected with the barrier via a guide pin guided through an opening in the printed circuit board.

For a better understanding of the present invention, reference is made to the following description and accompanying drawings while the scope of the invention will be pointed out in the appended claims.

BRIEF DESCRIPTION OF THE DRAWINGS

In the drawings:

FIG. 1 shows a section of a system with supported barrier in which two parts move vertically relative to one another;

FIG. 1a shows an enlarged view of a contact element from FIG. 1;

FIG. 2 shows a section from a system with suspended barrier;

DESCRIPTION OF THE PREFERRED EMBODIMENTS

Figure 3:
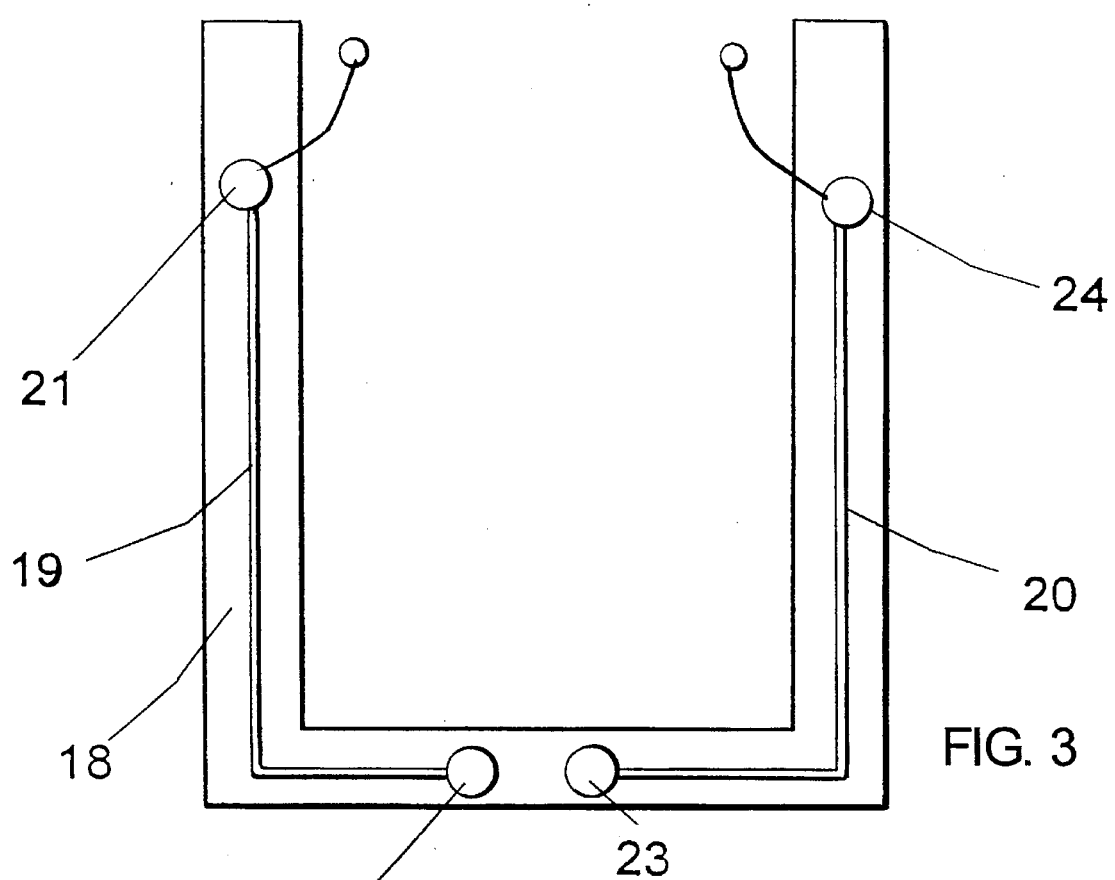
FIG. 3 shows an arrangement of conductor paths and contacts for a variant with supported barrier.

According to FIGS. 1 and 1a, a barrier 3 which is constructed as a solid body is fastened to a first, stationary part 1 by means of three contact elements 4 arranged in a row, a second part 2 being movable in a vertical direction relative to the stationary part 1. At the contact elements 4, only one of which is visible in the drawing, the barrier 3 is connected with a guide pin 5 which supports a contact bridge 6. The contact bridge 6 is pressed against contacts 8 of lines 9 by a spring 7 and accordingly completes an electrical circuit of a safety circuit 10. At one side, acting as shear line 11, the barrier 3 is adapted in shape to the shape of the second part 2 and is arranged in such a way that the two complementary shapes can move past one another.

If a foreign object is located in the region of the shear line 11 when the second part 2 and first part 1 approach one another, this foreign object will press the barrier 3 against the first part 1 upon contact with the second part 2. As a result, the connection between the contacts 8 of the lines 9 produced by the contact bridge 6 will be interrupted in at least one of the contact elements 4. The safety circuit 10 switches off the drive 55 of the second part 2. In order to stop in due time, the selected distance w is greater than the braking distance required to stop the movement.

In another construction according to FIG. 2, contact elements 13 formed by stationary contacts 14 are provided within a stationary first part 12 and a preferably spherical contact bridge 16 which is fastened to a pin 15 is supported on the contacts 14. The pin 15 is connected with a barrier 17 in such a way that the barrier 17 is suspended from the first part 12.

If necessary, a pressure spring 56 which presses the contact bridge 16 against the contacts 14 may be used to stabilize this system.

The construction according to FIG. 2 is suitable for technical solutions in which a movable second part, not shown in this drawing, moves upward toward the first part 12 with reference to the drawing. A foreign object located between the parts moving past one another is pressed against the barrier 17 so that the contact bridge 16 is lifted from the contacts 14.

Naturally, the barrier can also be arranged at the moving part, if necessary, in either the supported or suspended barrier variant.

Figure 4:
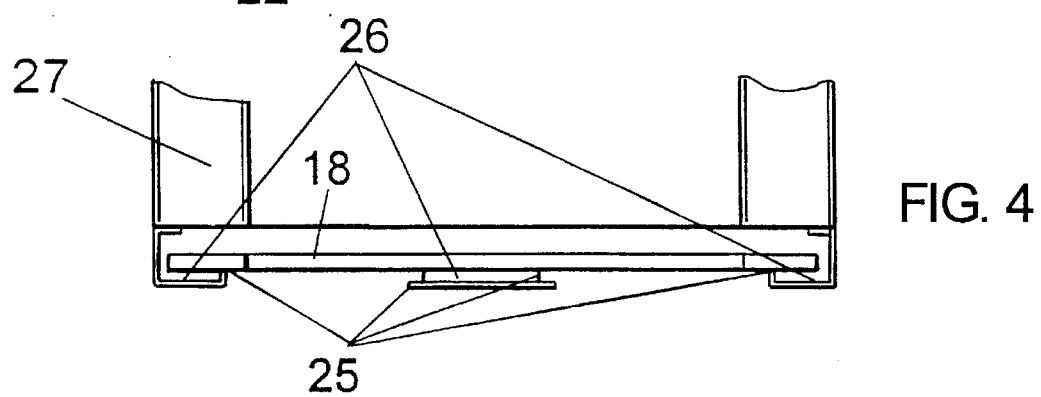
FIG. 4 shows a first type of fastening of the supported barrier according to FIG. 3.
Figure 5:
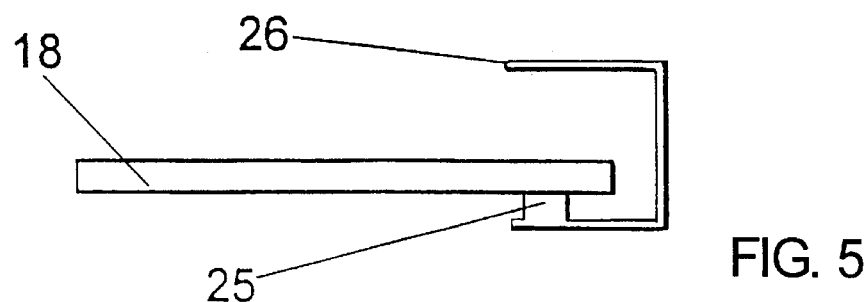
FIG. 5 shows a second type of fastening of the supported barrier according to FIG. 3.

In the solution according to the invention shown in FIGS. 3 to 5, a supported barrier 18 carries contacts 21, 22, 23, 24 which are connected by conductor paths 19, 20. The contacts 21, 22, 23 and 24 are supported on contacts 25 of angled parts 26 of a stationary first part 27. The complete leads to the contacts 25 are not shown in the drawing. In this variant of the supported barrier 18, contact is interrupted and the moving part is stopped when the barrier 18 is lifted.

Figure 6:
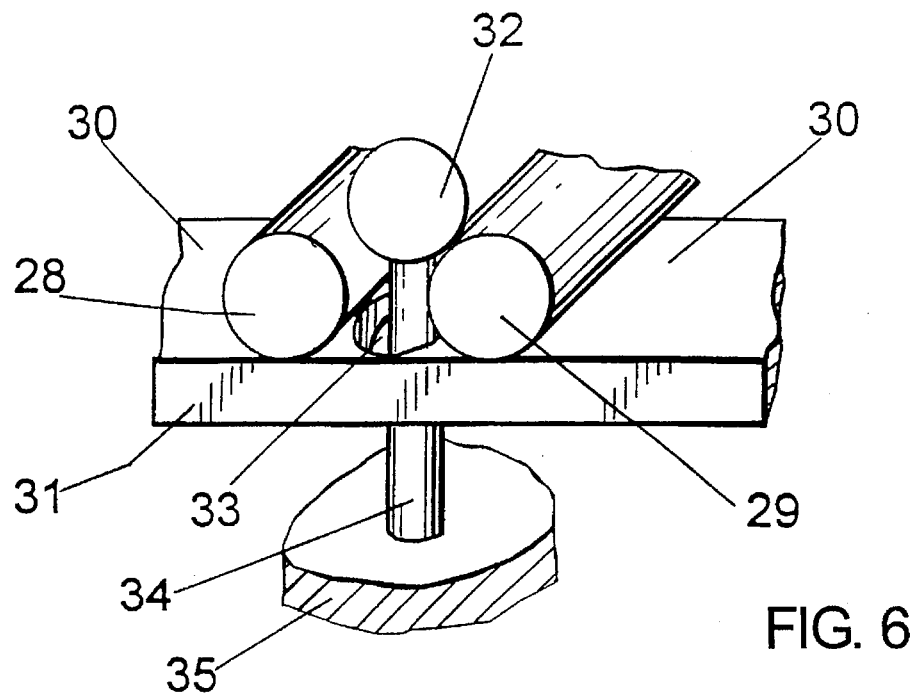
FIG. 6 shows the construction of a contact element.

The construction of a contact element according to FIG. 6 provides cylindrical contacts 28, 29 which are connected to adjacent parts of an interrupted conductor path 30 on a printed circuit board 31. The electrical connection between the contacts 28, 29 and accordingly the adjacent parts of the conductor path 30 are produced by a spherical element 32 which is connected with a barrier 35 via a guide pin 34 which is guided through an opening 33 in the printed circuit board 31.

Figure 7:
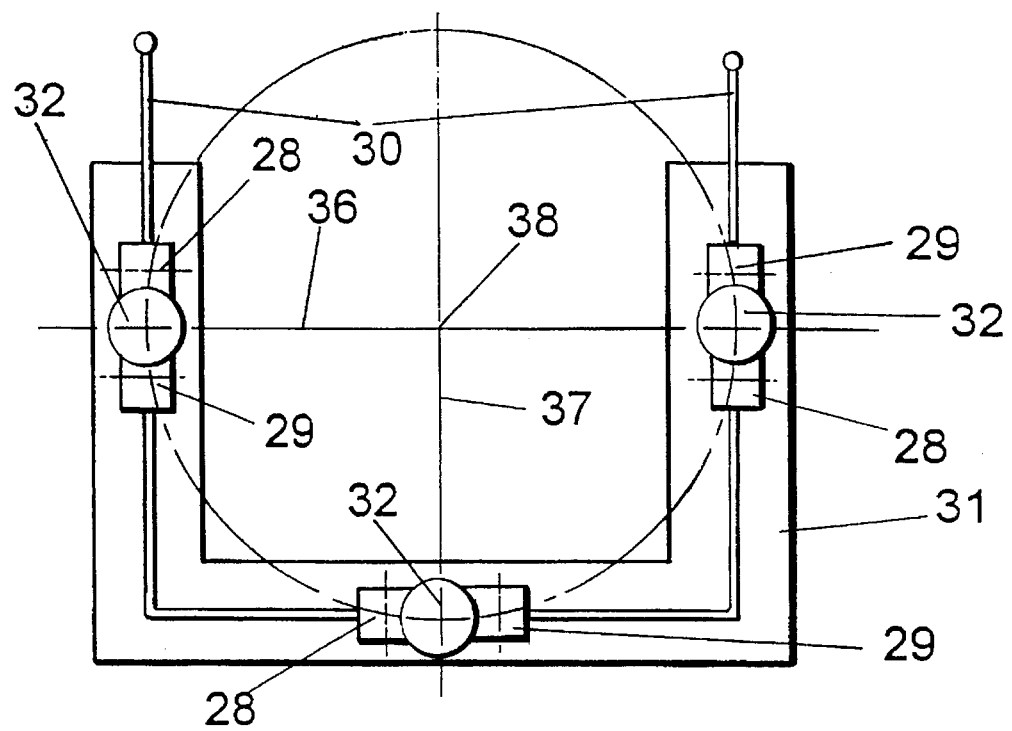
FIG. 7 shows a radial arrangement of contact elements according to FIG. 6.

In FIG. 7, contact elements according to FIG. 6 are arranged along a circular arc so that lines 36, 37 drawn through the center of the contacts intersect in the center 38 of a circle.

While the foregoing description and drawings represent the preferred embodiments of the present invention, it will be obvious to those skilled in the art that various changes and modifications may be made therein without departing from the true spirit and scope of the present invention.

What is claimed is:

1. A device at a loading or unloading station, comprising:

a first part;

a second part movable past said first part;

automatic safety means for preventing shearing or pinching of a foreign object caught between said first part and said second part during movement of said second part towards said first part, said safety means including a solid barrier member displaceably fastened to one of said first part and said second part, said safety means further including detector means in operative engagement with said barrier member for detecting a displacement of said barrier member owing to an interposition of said foreign object between said barrier member and the other of said first part and said second part, said detector means including three electrical contacts in non-colinear, three-point formation in a single electrical circuit, said contacts and said circuit being closed in a reference position of said barrier member.

2. The device according to claim 1 wherein said first part is stationary and said barrier member is displaceably fastened to said first part via three spring loaded guide pins spaced from one another in a linear array, each of said guide pins carrying a contact bridge for a respective one of said electrical contacts.

3. The device according to claim 1 wherein said barrier member is displaceably fastened to said second part via at least one pin carrying a spherical contact bridge at an end opposite said barrier member, said spherical contact bridge being supported in said reference position on stationary contact elements disposed on said first part.

4. The device according to claim 3 wherein a pressure spring is provided for pressing said spherical contact bridge against said stationary contact elements.

5. The device according to claim 1 wherein said first part is stationary and is provided with angle elements, said barrier member being supported on said angle elements.

6. The device according to claim 1 wherein said electrical contacts are disposed along a circular arc.

7. The device according to claim 6 wherein each of said electrical contacts includes contact elements formed by cylindrical pieces connected to adjacent parts of an interrupted conductor path on a printed circuit board, each of said electrical contacts further including a spherical bridge which is attached to said barrier member via a guide pin extending through an opening in said printed circuit board.

8. An assembly with automatic safety means for preventing shearing or pinching of a foreign object, comprising:

a first part;

a second part;

drive means operatively connected to at least one of said first part and said second part for moving same relatively past one another;

a barrier member displaceably mounted to said first part; and detector means disposed on said first part in operative engagement with said barrier member for detecting a displacement of said barrier member, said detector means being operatively connected to said drive means for de-activating said drive means upon detecting a displacement of said barrier member, said detector means including three electrical contacts in non-colinear, three-point formation in a single electrical circuit, said contacts and said circuit being closed in a reference position of said barrier member.

9. The assembly according to claim 8 wherein said barrier member being displaceably fastened to said first part via three spring loaded guide pins spaced from one another in a linear array, each of said guide pins carrying a contact bridge for a respective one of said electrical contacts.

10. The assembly according to claim 8 wherein said barrier member is displaceably fastened to said first part via at least one pin carrying a spherical contact bridge at an end opposite said barrier member, said spherical contact bridge being supported in said reference position on stationary contact elements disposed on said first part.

11. The assembly according to claim 10 wherein a pressure spring is provided for pressing said spherical contact bridge against said stationary contact elements.

12. The assembly according to claim 8 wherein said first part is provided with angle elements, said barrier member being supported on said angle elements.

13. The assembly according to claim 8 wherein said electrical contacts are disposed along a circular arc.

14. The assembly according to claim 13 wherein each of said electrical contacts includes contact elements formed by cylindrical pieces connected to adjacent parts of an interrupted conductor path on a printed circuit board, each of said electrical contacts further including a spherical bridge which is attached to said barrier member via a guide pin extending through an opening in said printed circuit board.

15. In a device for preventing shearing or pinching of a foreign object when two parts which can move past one another approach one another in the operation of loading and unloading stations in a clean room area or in its vicinity, in which a signal of a sensor interrupts the approach when the presence of a foreign body is detected in the region of approach, the device comprising a barrier which is constructed as a solid body being fastened to one of the parts so as to be displaceable relative to said other part, the improvement comprising:

conduction lines in said one part that the barrier is fastened to; and interconnection elements, each of these engaging two of said conduction lines and serving as contact bridges to provide electrical contact between both of said contact lines, wherein each of the interconnection elements together with the engaging conduction lines forms a contact element, the interconnection elements and contact lines being arranged to provide a non-colinear, three-point formation of contact elements having a normally closed circuit that is broken when at least one of the interconnection elements disengages from at least one of said conduction lines when the barrier presses against said one part.

16. The device according to claim 15, wherein the barrier is fastened at said one part in a resilient manner by guide pins which are arranged one after the other in a row, every guide pin carrying an interconnection element for closing said electrical circuit.

17. The device according to claim 15, wherein the barrier is fastened to one end of a pin carrying a spherical interconnection element at its other end, said spherical interconnection element being supported on the conduction lines inside the stationary part to form a closed circuit.

18. The device according to claim 17, wherein a pressure spring which presses the interconnection element against the conduction lines is included and used for stability.

19. The device according to claim 15, wherein the barrier is supported on contacts of angled parts of said one part by said conduction lines which are connected by conductor paths.

20. The device according to claim 15, wherein contact elements are arranged on a circle, wherein the interconnection elements extend in a tangential direction of said circle.

21. The device according to claim 20, wherein the interconnection elements are shaped spherically, having cylindrical sections at opposite sides of the sphere, the cylindrical sections being connected to adjacent parts of an interrupted conduction line on a printed circuit board, the spherical section being provided to establish contact and being connected with the barrier via a guide pin guided through an opening in the printed circuit board.

22. In a device for preventing shearing or pinching of a foreign object when two parts which can move past one another approach one another in the operation of loading and unloading stations in a clean room area or in its vicinity, in which a barrier which is constructed as a solid body is fastened at one of the parts so as to be displaceable relative to this part, the improvement comprising that the barrier comprises supports of electric contact elements in non-colinear, three-point formation which interconnect conductor paths coupled with said part to produce a closed circuit in a reference position of the barrier.

23. The device according to claim 22, wherein the barrier is supported at the stationary part in a springing manner by three guide pins which are arranged one after the other in a row, and every guide pin carries one of the contact bridges for producing the closed circuit.

24. The device according to claim 22, wherein the barrier is fastened to one end of a pin carrying a spherical contact bridge at its other end, this spherical contact bridge being supported on stationary contacts arranged inside the stationary part to form the closed circuit.

25. The device according to claim 24, including a pressure spring which presses the contact bridge against the contacts for stability.

26. The device according to claim 22, wherein the barrier is supported on contacts of angled parts of the stationary first part by contacts which are connected by conductor paths.

27. The device according to claim 22, wherein the contact elements are arranged on a circular path so that lines drawn through the center of the contact elements intersect in the center of a circle.

28. The device according to claim 27, wherein the contact elements are formed by cylindrical contacts which are connected to adjacent parts of an interrupted path on a printed circuit board and between which a spherical element produces an electric connection which is connected with the barrier via a guide pin which is guided through an opening in the printed circuit board.

* * * * *